United States Patent
Schmidt

(10) Patent No.: US 6,776,323 B2
(45) Date of Patent: Aug. 17, 2004

(54) SONOTRODE FOR ULTRASOUND WELDING OF PLASTICS

(75) Inventor: Gerhard Schmidt, Weissenburg (DE)

(73) Assignee: Dynamit Nobel Kunststoff GmbH, Weissenburg (DE)

(*) Notice: Subject to any disclaimer, the term of this patent is extended or adjusted under 35 U.S.C. 154(b) by 0 days.

(21) Appl. No.: 10/126,524

(22) Filed: Apr. 22, 2002

(65) Prior Publication Data

US 2002/0158104 A1 Oct. 31, 2002

(30) Foreign Application Priority Data

Apr. 21, 2001 (DE) .......................................... 101 19 614
Dec. 8, 2001 (DE) .......................................... 101 60 496

(51) Int. Cl.[7] .............................................. B23K 20/10
(52) U.S. Cl. ................. 228/1.1; 228/110.1; 156/580.2
(58) Field of Search .............................. 228/1.1, 110.1; 156/73.1, 73.2, 73.4, 73.6, 580.1, 580.2

(56) References Cited

U.S. PATENT DOCUMENTS

| | | | | |
|---|---|---|---|---|
| 3,900,354 A | * | 8/1975 | Carpenter | ................... 156/73.2 |
| RE28,642 E | * | 12/1975 | Davis | .......................... 228/1.1 |
| 3,934,783 A | * | 1/1976 | Larrison | ................... 228/110.1 |
| 4,025,374 A | * | 5/1977 | Spindler et al. | ........... 156/73.1 |
| 5,354,392 A | * | 10/1994 | Santo et al. | ................ 156/73.1 |
| 5,368,664 A | * | 11/1994 | Sugiyama et al. | ............ 156/69 |
| 5,525,172 A | * | 6/1996 | Cadiou | ....................... 156/73.1 |
| 5,715,590 A | * | 2/1998 | Fougere et al. | ............ 29/564.1 |
| 5,947,364 A | * | 9/1999 | Tamura et al. | ................ 228/1.1 |
| 6,106,015 A | * | 8/2000 | Udwin et al. | .................. 281/29 |

* cited by examiner

Primary Examiner—Kiley Stoner
Assistant Examiner—Kevin McHenry
(74) Attorney, Agent, or Firm—Antonelli, Terry, Stout & Kraus, LLP

(57) ABSTRACT

A sonotrode for an ultrasonic welding device has an ultrasound generator that supplies high-frequency electrical energy to a converter that converts this energy into mechanical vibrations and conveys the latter, optionally via a booster, to a sonotrode (2). The sonotrode (2) is formed with a contact surface (3). In order to avoid troublesome sink marks, pegs (1) are arranged on the contact surface (3).

9 Claims, 2 Drawing Sheets

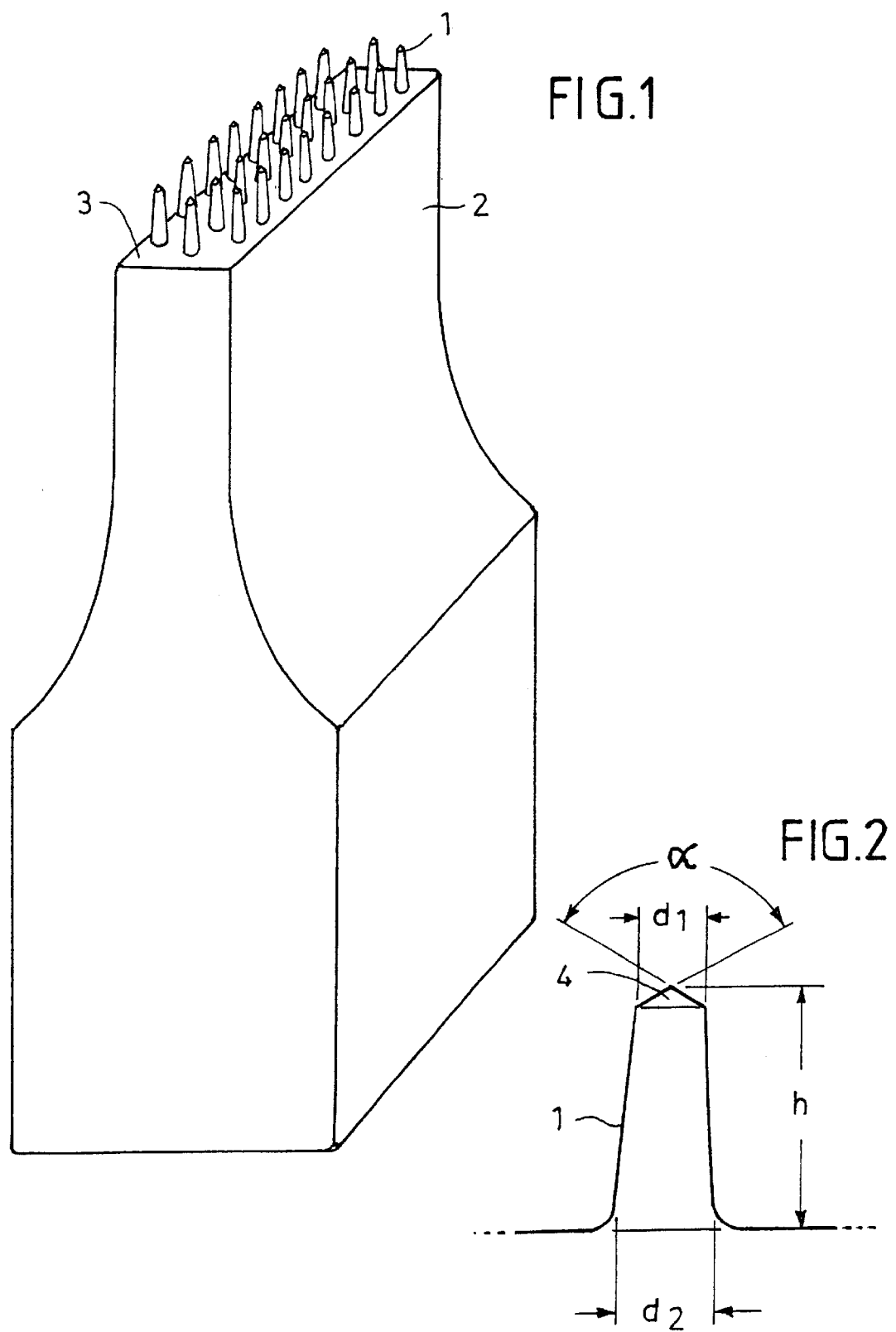

SONOTRODE FOR ULTRASOUND WELDING OF PLASTICS

BACKGROUND OF THE INVENTION

The invention relates to a sonotrode for an ultrasonic welding device.

Welding is the joining of materials under the action of heat and pressure. The heat is generated as follows:

A generator supplies high-frequency (e.g. 35 KHz) electrical energy that is converted by means of piezoelements in a sonic converter (converter) into mechanical longitudinal vibrations.

These high-frequency vibrations are transmitted, if necessary via a booster, to a sonotrode and, due to internal friction, heat up the plastics material to be welded. The sonotrode is, in this connection, brought into contact with the parts to be welded.

The thermoplastic plastics material is made to flow on applying the sonotrode. On cooling under pressure a joint is produced that can transmit forces.

Depending on the plastics material, a distinction is made for example between "far-field welding", (suitable only for hard, brittle plastics materials with a low mechanical loss factor), in which the high-frequency vibration is conducted with low losses through the moulded part to the welding point, and "near-field welding" or "contact welding" in which the distance between the application point of the sound and the welding site is small, since the vibration is rapidly attenuated in the soft plastics material.

In two-dimensional welding by means of ultrasound, thermal energy (e.g. 300–1200 watts at the generator) is applied locally per welding point to the plastics material.

A problem with the above procedure is the occurrence of sink marks, which are formed on the side (e.g. lacquered visible surface of a vehicle bumper) opposite to the welding.

In ultrasound welding, e.g. of interlocking parts in the bumper outer skin of a vehicle, a frictional connection is nowadays normally produced by means of a welding dome (rib) onto which a slotted bracket is pushed by riveting the dome (mushroom-shaped bead).

It has hitherto been possible to gate ribs onto the outer skin by means of specially designed joints, edges, etc without the resulting troublesome sink marks interfering.

If ribs would not be possible, the welding was carried out "directly", i.e. two-dimensionally, using so-called "two-dimensional sonotrodes".

However, troublesome sink are marks are thereby formed, which are normally not accepted by the customer.

SUMMARY OF THE INVENTION

The object of the invention is to improve a sonotrode for an ultrasonic welding device so that troublesome sink marks are avoided.

According to the invention this object is achieved if pegs are arranged on the contact surface. The energy is thus no longer applied over the contact surface, but instead over the pegs.

In a preferred embodiment the pegs are of conical shape, thereby facilitating insertion into the workpiece.

The conicity of the pegs is in the range 5° to 20°, and is preferably ca. 10° with respect to the tip.

In the case of two structural parts to be welded having wall thicknesses of 2.7 and 3.6 mm, then, depending on the geometry, the length of the pegs is preferably between 4 and 5 mm, more preferably 4.3 mm.

In a preferred embodiment at least two parallel rows of pegs are arranged on the contact surface of the sonotrode. Alternatively three parallel rows of pegs are provided, the two outer rows consisting of eight pegs and the middle row of nine pegs. In principle, any layout may be employed in which the pegs seen in plan view are arranged symmetrically with respect to two mutually perpendicular axes.

Preferably the tip of the pegs has a triangular cross-section symmetrical in the longitudinal direction with a tip angle $\alpha$ of $60° < \alpha < 150°$, preferably $\alpha = 120°$.

Advantageously the sonotrode is used to weld thermoplastics plastics materials, in particular to weld outer parts of vehicles, such as bumpers to their inner parts, i.e. structural parts with visual requirements and with associated mounting elements and stiffening elements.

It is particularly advantageous having regard to the problem of sink marks if the parts are lacquered prior to welding.

It has been found from tests with different sonotrode shapes that one specific sonotrode shape, namely the so-called "fakir sonotrode", has advantageous properties as regards the problem of sink marks mentioned above. Tests with this shape have produced the best visual result throughout.

The geometry of the sonotrode according to the invention consists of a plurality of small pegs that have a conicity (in this case ca. 10°) (slight deformation on removing the sonotrode), as well as a tip (promoting fusion). Due to the large number of small tips, the required amount of thermal energy is applied particularly smoothly and well distributed in the plastics material, resulting in few sink marks. The length of the pegs was determined in a test for the wall thicknesses of the parts to be welded (2.7 mm thick on 3.6 mm thick). A peg length of 4.3 mm has proved suitable.

Some examples of a sonotrode according to the invention are described hereinafter.

Influence of the Welding and Lacquering Sequence:

When welding unlacquered parts of wall thicknesses 2.7 mm and 3.0 mm, detachment forces of 270±30 N were achieved. The subsequently lacquered surface exhibited slight sink marks.

These sink marks were significantly reduced if (under otherwise identical conditions) a lacquered sample plate was welded. Indeed, the side to be welded should be free from traces of lacquer in order not to affect the welding adversely. In order not to damage the lacquered surface the device should be suitably padded.

It has been established that a prior lacquering has a positive effect on the visual quality of the visible surface as regards sink marks. The explanation of this might well lie in the effect of heat during lacquering.

This explanation has been confirmed in a test in which a previously heat-treated part was welded and compared with a non-heat-treated welded part: the incidence of sink marks in the heat-treated part was less than in the non-heat-treated part, but not necessarily to the same extent as in the lacquered part. The lacquer layer probably has a positive effect in reducing the sink marks as well.

Effect of the Wall Thickness:

Increasing the wall thickness of the bumpers from 3.0 mm to 3.6 mm significantly reduced the sink marks:

In a welding test with a fakir sonotrode involving wall thicknesses of 2.7 mm and 3.6 mm, in which the unlacquered parts were welded, detachment forces of 300±40 N were measured. The subsequently lacquered test plates exhibited virtually no more sink marks.

Effect of the Peg Length/Penetration Depth:

Starting from the original fakir sonotrode (peg length 3 mm) a fakir sonotrode with shorter pegs (peg length 3.4 mm) was prepared in order to investigate whether the incidence of sink marks could be reduced in this way.

It was found that with this short peg length a reliable welding (wall thicknesses of 2.7 mm and 3.0 mm, detachment force >200 N) can be achieved only if the sonotrode is completely sunk in, i.e. the whole sonotrode projects into the structural part. In this case a great deal of energy (>700 watts) is supplied to the plastics material; the sink marks are very pronounced. Long pegs are therefore more appropriate since, in this case, the sonotrode base does not contact the plates to be welded, and only the pegs project. Only about half as much energy (around 300 watts) is required under otherwise identical conditions in order to weld the structural parts and the sink marks are less pronounced.

For an adequate welding (detachment force >200 N) it is therefore not necessary to sink the sonotrode down to the peg base. The contact pressure may be applied solely through the press pad. This is utilised in the so-called "deep switch-off" procedure, in which the ultrasound is switched off as soon as the sonotrode has reached a defined depth.

BRIEF DESCRIPTION OF THE DRAWINGS

Further features are shown in the figures which are described hereinafter, and in which:

FIG. 1 shows a sonotrode according to the invention,

FIG. 2 shows an individual peg of the sonotrode, and

DETAILED DESCRIPTION OF THE PREFERRED EMBODIMENTS

Figure 3:
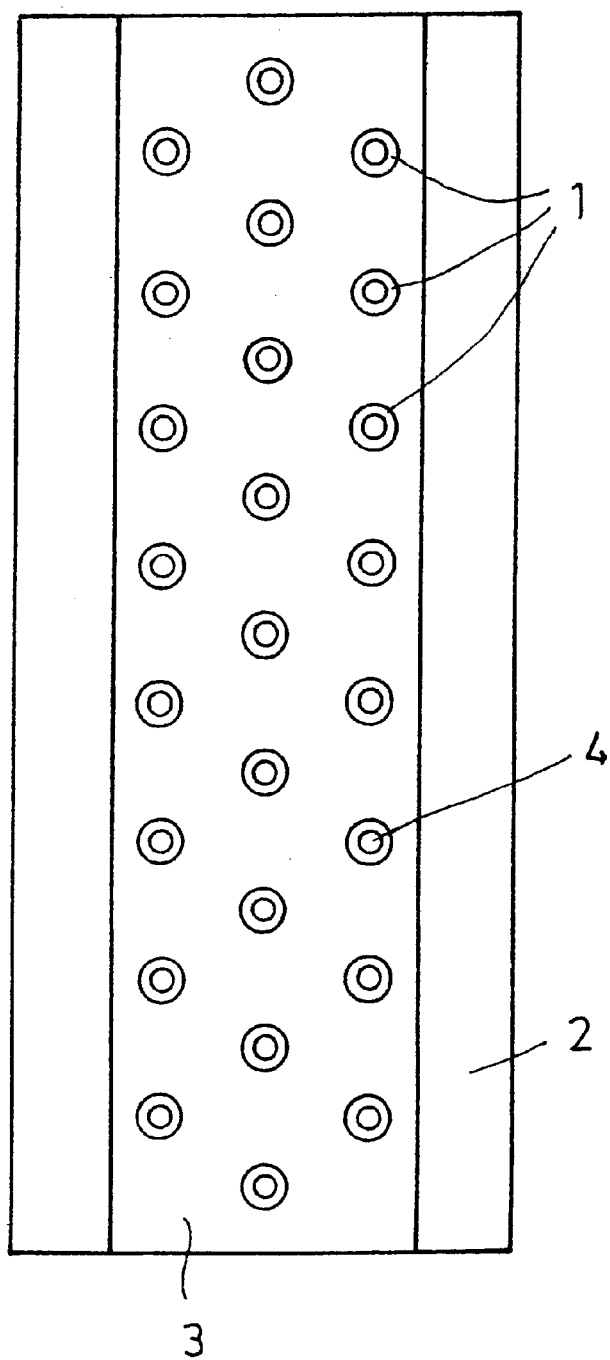
FIG. 3 shows a view of the contact surface of the sonotrode.

FIG. 1 shows a sonotrode 2 according to the invention, also termed a fakir sonotrode. This sonotrode is connected (not shown) optionally via a booster to the sound converter (converter) of an ultrasonic welding device.

The contact surface 3 of the sonotrode 2 has three rows of pegs 1, the centre row containing nine pegs 1 and the two outer rows each containing eight pegs 1.

FIG. 3 is a plan view of the contact surface 3 showing the individual pegs 1 of the sonotrode 2.

FIG. 2 shows an individual peg. The peg length is denoted by h. The peg 1 is conically shaped and tapers towards the tip at an angle of about 10°. The tip 4 of the peg 1 has a pyramidal cross-section with a tip angle $\alpha$ of 120°. The foot of the peg 1 located at the contact surface 2 has a diameter $d_2$=2.0 mm, and the diameter $d_1$ at the tip 4 is 1.4 mm.

What is claimed is:

1. Sonotrode for an ultrasonic welding device having an ultrasound generator that supplies high-frequency electrical energy to a converter that converts this energy into mechanical vibrations and conveys the latter optionally via a booster to a sonotrode, the sonotrode having a contact surface, characterised in that pegs are arranged on the contact surface, the pegs are conically shaped, and a conicity of the pegs is between 5° and 20° with respect to the tip.

2. Sonotrode according to claim 1, characterised in that a length (h) of the pegs amounts to between 4 and 5 mm in a case of two structural parts to be welded of wall thicknesses 2.7 mm and 3.6 mm depending on the geometry.

3. Sonotrobe according to claim 2, characterised in that the length (h) of the pegs is 4.3 mm.

4. Sonotrode according to claim 1, characterised in that, in plan view, the pegs are arranged axially symmetrically with respect to two mutually perpendicular axes.

5. Sonotrobe according claim 4, characterised in that the pegs are arranged in three parallel rows.

6. Sonotrobe according to claim 5, characterised in that outer rows of the three parallel rows each contain eight pegs and a middle row of the three parallel rows contains nine pegs.

7. Sonotrode according to claim 1, characterised in that the tips of the pegs have a triangular cross-section symmetrical in the longitudinal direction, with a tip angle $\alpha$ of 60°<$\alpha$<150°.

8. Sonotrobe according to claim 7, characterised in that the tips of the pegs have a tip angle $\alpha$ of 120°.

9. Sonotrobe according to claim 1, characterised in that the conicity of the pegs is about 10° with respect to the tip.

* * * * *